(12) United States Patent
Brown et al.

(10) Patent No.: US 6,228,901 B1
(45) Date of Patent: May 8, 2001

(54) METHOD OF PRODUCING WEAR-RESISTANT TRAFFIC MARKING AND TRAFFIC PAINT USED THEREIN

(75) Inventors: Ward Thomas Brown, North Wales; Ann Robertson Hermes, Ambler, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/286,040

(22) Filed: Apr. 5, 1999

Related U.S. Application Data

(60) Provisional application No. 60/081,938, filed on Apr. 16, 1998.

(51) Int. Cl.[7] .............................. F21V 7/22; B32B 27/30; C08L 33/10; C08L 33/08; C08L 39/00
(52) U.S. Cl. .................. 523/172; 427/136; 427/137; 428/489; 428/500; 524/501; 524/522; 524/523; 524/555; 524/556; 524/521
(58) Field of Search .................................. 524/501, 522, 524/523, 521, 555, 556; 523/172; 427/136, 137; 428/489, 500

(56) References Cited

U.S. PATENT DOCUMENTS

| | | | | |
|---|---|---|---|---|
| 4,436,845 | * | 3/1984 | Kitano | 523/172 |
| 5,705,560 | * | 1/1998 | Takarabe et al. | 524/556 |
| 5,824,734 | * | 10/1998 | Yang | 524/555 |

* cited by examiner

Primary Examiner—Peter Szekely

(57) ABSTRACT

This invention relates to a method of producing traffic producing wear resistant traffic markings on road surfaces and to the traffic paint used therein. When a traffic paint containing a highly hydrophobic polymer, which is free from styrene is utilized, a wear resistant traffic marking is produced.

8 Claims, No Drawings

METHOD OF PRODUCING WEAR-RESISTANT TRAFFIC MARKING AND TRAFFIC PAINT USED THEREIN

This application claims benefit of Provisional No. 60/081,938 filed Apr. 16, 1998.

FIELD OF THE INVENTION

This invention generally relates to a method of producing traffic markings on road surfaces and more particularly to producing wear resistant traffic markings on road surfaces.

BACKGROUND OF THE INVENTION

White and yellow traffic markings used for demarcating traffic lanes is a common sight on almost all roads. These markings ensure safe driving conditions under varying weather conditions. The term "roads" generally means routes, highways, airport runways, exit and entry ramps, passes, pavements, side walks or parking lots for vehicles, such as, autos, bikes, trucks, and the roads are usually paved with asphalt, wood, metal or from concrete, generally made from Portland cement. The majority of these traffic markings, such as, solid, transverse or interrupted stripes, are paint-based and traditionally include solvent-borne binders, which are predominantly alkyds and chlorinated rubber-modified alkyds. However, since the 1980s environmentally safer waterborne traffic paints have also been used. These waterborne traffic paints are primarily based on acrylic emulsions and produce dramatically lower VOC emissions than traditional solvent-based traffic paints.

However, these conventional waterborne traffic markings tend to be less wear resistant than traditional alkyd based traffic paints when exposed to traffic conditions, such as, wear and tear resulting from exposure to vehicular traffic. The term wear resistance means the degree of resistance of the traffic markings to detaching from the road surface when the marking is exposed to the traffic conditions and to UV degradation. The wear resistance is expressed as the percentage area of a film of traffic marking still remaining on the road surface after its extended exposure to such traffic conditions. It has been found that substantial portions of conventional waterborne traffic markings tend to wear away in less than a few months after exposure to such accelerated traffic conditions.

Attempts have been made to solve the problem of the excessive traffic marking wear. For example, Clinnin et al. in the U.S. Pat. No. 5,340,870 describe a fast dry wear resistant traffic marking paint containing a hydrophobic polymer emulsion polymerized in the presence of a water-soluble support polymer that is polymerized from a monomer mixture consisting of acid, styrene and substituted styrene monomers, preferably in equal proportions. One of the problems associated with such a styrene based traffic paint is that it tends to degrade over time when exposed UV radiation from sun that is typically experienced by traffic markings. Thus, a need still exists for a waterborne traffic paint having improved wear resistance under typical traffic conditions.

STATEMENT OF THE INVENTION

The present invention is directed to a method of producing a wear resistant traffic marking on a road surface, the method comprising:

applying on the road surface a layer of an aqueous traffic paint, which comprises a polymer polymerized from a monomer mixture that includes in the range of from 80 percent to 99.9 percent, all in weight percentages based on polymer solids, of one or more hydrophobic monomers; and drying the layer to form the wear resistant traffic marking on said road surface.

One of the advantage of the method of the present invention is that it produces traffic markings, that are wear-resistant even under exposure to UV radiation from sun, which is typically experienced by traffic markings.

DESCRIPTION OF THE PREFERRED EMBODIMENT

As used herein:

"Polymer" means a dispersed, solubilized or a sequential polymer, defined below.

"Dispersed polymer" means particles of polymer colloidally dispersed and stabilized in an aqueous medium.

"Solubilized polymer" includes "Water soluble polymer", "Water reducible polymer" or a mixture thereof. Water soluble polymer means a polymer dissolved in an aqueous medium. Water reducible polymer means a polymer dissolved in water and a water miscible organic solvent, such as, methanol, ethanol and glycol ethers. Solubilized polymer results in a polymer solution characterized by having the self-crowding constant (K) of the Mooney equation $[1/\ln_{72\,rel}=1/BC-K/2.5]$ equal to zero. By contrast, dispersed polymer has (K) equal to 1.9. The details of Mooney equation are disclosed in an article entitled "Physical Characterization of Water Dispersed and Soluble Acrylic Polymers" by Brendley et al., in "Nonpolluting Coatings and Coating Processes" published by Plenum Press, 1973 and edited by Gordon and Prane. "Sequential polymer" means particles of a polymer colloidally dispersed and stabilized in an aqueous medium having a core/shell morphology.

"Tg of a polymer" is a measure of the hardness and melt flow of the polymer. The higher the Tg, the lesser will be the melt flow and the harder will be the coating. Tg is described in *Principles of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values.

For the measurement of the Tg of a polymer, differential scanning calorimetry (DSC) can be used. To measure the Tg by the DSC method, the polymer samples were dried, preheated to 120° C., rapidly cooled to −100° C., and then heated to 150° C. at a rate of 20° C./minute while data was being collected. The Tg was measured at the midpoint of the inflection using the half-height method.

"GPC number average molecular weight" means the number average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard. The GPC number average molecular weight can be estimated by calculating a theory number average molecular weight. In systems containing chain transfer agents, the theory number average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series. To measure the particle diameter, 0.1 to 0.2 grams of a sample of acrylic polymer was diluted to a total of 40 milliliters (mLs) with distilled water. A two mLs portion was delivered into an acrylic cell, which was then capped. The particle size in nanometers was measured for 1000 cycles. The measurement was repeated three times and an average was reported.

"Polymer solids" means the polymer in its dry state.

"(meth)acrylate" includes acrylate and methacrylate.

"Hydrophobic monomer" means a monomer having a Hansch π value of 2.2 or more.

"Hydrophilic monomer" means a monomer having a Hansch π value of less than 2.2.

The first step of the method of the preferred embodiment of the present invention is directed to applying on a road surface a layer of an aqueous traffic paint. The layer of the coating composition may be applied by the methods well known in the art, such as, for example, by spraying the composition on the road surface by conventional means, such as, truck mounted spray gun(s) where the paint is supplied from an air pressurized tank or by means of an airless pump, or by means of plural component sprays. If desired, the traffic paint may be hand applied by means of a paint brush, squeegee or a paint roller. If desired, the road surface on which the layer of the aqueous traffic paint is applied, may be cleaned preferably by removing any dirt or sediments prior to the application of the aqueous traffic paint. The thickness of the layer of the aqueous traffic paint generally varies from 300 micrometers to 3000 micrometers, preferably from 350 micrometers to 1000 micrometers.

The second step of the method of the present invention is drying the layer to form the wear resistant traffic marking. During the drying step, an aqueous evaporable carrier contained within the traffic paint is evaporated from the layer applied to the road surface. The rate of evaporation of the aqueous evaporable carrier is dependent upon the ambient conditions to which the layer of the traffic paint is exposed to and also upon the thickness of the layer applied to the road surface. It is to be noted that, higher the atmospheric humidity, longer will be the no-pick-up time for the layer, as evaluated under ASTM D 711-89. For example. when the relative humidity is in the range of 65 percent to 90 percent, the no-pick-up time for the layer varies in the range of from 1 minute to 60 minutes, preferably in the range of from 1 minute to 20 minutes and most preferably in the range of from 1 minute to 10 minutes from the application of the layer.

The applicants have unexpectedly discovered that when a traffic paint which includes a polymer polymerized from a monomer mixture containing 80 weight percent or more, preferably in the range of from 80 weight percent to 99.5 weight percent, more preferably in the range of from 80 weight percent to 90 weight percent and most preferably in the range of from 85 weight percent to 90 weight percent of one or more hydrophobic monomers having a Hansch π value of at least 2.2, preferably at least 3, is used, its wear resistance is significantly improved over those traffic compositions which do not contain the foregoing polymer.

The polymer in the traffic paint used in the present invention has a Tg in the range of from 0° C. to 60° C., preferably in the range of from 10° C. to 40° C., and a GPC number average molecular weight varying in the range of from 1000 to 1000,000, preferably in the range of from 5000 to 200,000, and most preferably in the range of from 5000 to 50,000. The polymer of the composition may be a dispersed polymer having polymer particles dispersed in an aqueous evaporable carrier or it may either be a water soluble polymer, a water-reducible polymer, a mixture of the water soluble and water-reducible polymers in the aqueous evaporable carrier, or a mixture of the dispersed, water-reducible and water soluble polymers in the aqueous evaporable carrier. If desired the polymer may include a mixture of a dispersed polymer with a water soluble or a water-reducible polymer. The polymer in the form of a dispersed polymer particles is preferred, wherein the particle size of the dispersed polymer particles varies in the range of from 20 to 1000 nanometers, preferably in the range of from 30 to 300 nanometers, more preferably in the range of from 100 to 250 nanometers.

The hydrophobic monomers suitable for use in the present invention include monomers having a Hansch π value of at least 2.2. Some of such hydrophobic monomers include isobornyl methacrylate, butyl methacrylate (Hansch π value 3.19), isobutyl (meth)acrylate (Hansch rI value 2.22), ethyl methacrylate Hansch π value 2.43), 2-ethylhexyl methacrylate (Hansch π value 5.22), stearyl (meth)acrylate, lauryl (meth)acrylate, butadiene ethylene, and combinations thereof. Butyl methacrylate is preferred.

However, even though styrenes or substituted styrenes, which are substituted with alkyl, aryl, alkoxy, chloro, bromo, iodo, or nitro groups have a Hansch of more than 2.2, these are excluded from the monomer mixture from which the polymer is polymerized, since traffic markings made from a traffic paint containing a styrene based polymer tends to degrade when subjected to UV radiation, which is typically experienced by traffic markings.

In addition to the hydrophobic monomer(s) described above, the remainder of the monomer mixture includes at least one or more of the following hydrophilic monomers having a Hansch π value of less than 2.2. Some of these hydrophilic monomers include:

Methyl acrylate, ethyl acrylate, methyl methacrylate, hydroxyethyl (meth)acrylate, and hydroxypropyl (meth) acrylate; (meth)acrylamide or substituted (meth) acrylamides, substituted with alpha-alkyl or aryl groups or N-alkyl or aryl groups; vinyl monomers, such as, for example, vinyl pyridine, N-vinyl pyrrolidone; acrylonitrile or methacrylonitrile. Additionally copolymerizable ethylenically-unsaturated acid monomers in the range of from 0.1% to 10%, by weight based on the total weight of polymer solids of an acrylic acid, methacrylic acid, crotonic acid, itaconic acid, fumaric acid, maleic acid, monometlyl itaconate, monomethyl fumarate, monobutyl fumarate, maleic anhydride, 2-acrylamido-2-methyl-1-propanesulfonic acid, sodium vinyl sulfonate, phosphoethyl methacrylate, and combinations thereof may be used.

The polymer may be prepared by any known procedures, such as emulsion polymerization, solution polymerization, dispersion polymerization, and solid phase polymerization. Emulsion polymerization is preferred. Some of the emulsion polymerization procedures are provided in well known texts on the subject such as "Emulsion Polymerization: Theory and Practice" by D. C. Blackley published by Wiley in 1975 and "Emulsion Polymerization" by F. A. Bovey et al. published by Interscience Publishers in 1965.

The polymerization techniques used to prepare a dispersed polymer are well known in the art. The dispersed polymers are preferably prepared by emulsion polymerization. Either thermal or redox initiation processes may be used. Redox systems using the same initiators may be used at similar levels as thermal systems when coupled with a suitable reductant such as, for example, isoascorbic acid and sodium bisulfite.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05% to 3.0% by weight, based on the weight of total monomer.

The composition of the polymer may contain one or more conventional chain-transfer agents for controlling the molecular weight of the resulting polymer. Suitable chain transfer agents include, for example, $C_1$ to $C_{12}$ alkyl or functional alkyl mercaptans, alkyl or functional alkyl mercaptoalkanoates or halogenated hydrocarbons, which may be employed at levels in the range of from about 0.1 percent to about 10 percent by weight based on total polymer solids.

If desired, the polymer may be a sequential polymer, which includes particles containing two or more polymeric phases, such as, for example, an inner phase, and an outer phase, wherein the outer phase is the predominant phase in contact with the aqueous medium in which the particle is dispersed. Some particles containing two or more polymeric phases include core/shell particles, core/shell particles with shell phases incompletely encapsulating the core, core/shell particles with a multiplicity of cores, or interpenetrating network particles.

The sequential polymers are prepared by conventional emulsion polymerization process, preferably by well known multi-stage emulsion polymerization, in which at least two stages differing in composition are formed in a sequential fashion. Such a process usually results in the formation of at least two mutually incompatible polymer compositions, thereby resulting in the formation of at least two phases. Each stage of the sequential polymer particles may contain the same monomers, chain transfer agents, surfactants, as those disclosed earlier for the dispersed polymer. The emulsion polymerization techniques used for preparing such sequential polymers are well known in the art and are disclosed, for example, in the U.S. Pat. Nos. 4,325,856, 4,654,397 and 4,814,373, which are incorporated herein by reference.

If desired, the layer may be contacted with polyamine immediately prior to, during or after applying the layer on the road surface. The polyamine may be applied as a separate spray or it may be blended with the composition. The polyamine may include an amine modified polymer, or a blend of the polymer with a polyfunctional amine or a combination, preferably in equal proportions, of the blend and the amine modified polymer. The blend includes from 0 to 20 percent, preferably 0.5 to 10, and more preferably 1 to 5 percent, of the polyfunctional amine, all in weight percentages based on the total weight of the blend solids. The presence of the amine modified polymer, or the blend of the polymer with the polyfunctional amine or the combination thereof enhances the dry time of the traffic markings.

Essentially all of the polyfunctional amine or the amine modified polymer suitable for blending with the polymer is maintained in a deprotonated state by raising the pH of the aqueous evaporable carrier of the polymer to the range of from 7.5 to 11, preferably from 9.5 to 10.5. This means essentially all of the amine functional groups in the polyfunctional amine or in the amine modified polymer are in a deprotonated state. The pH of the aqueous evaporable carrier is raised by adding a base, such as, ammonia; alkali metal hydroxide, such as, sodium hydroxide; morpholine and the lower alkyl amines, such as, 2-methylaminoethanol, 2-dimethylaminoethanol, N-methylmorpholine and ethylenediamine. Volatile bases, such as, ammonia, or a mixture of volatile bases and nonvolatile bases, such as, sodium hydroxide, are preferred. Ammonia in particular is most preferred. As a result of deprotonation of the amine functional groups in the polyfunctional amine, essentially all of amine functional groups are uncharged, i.e., neutralized, thus preserving colloidal stability of the polymer.

The polyfunctional amine is polymerized from 20 percent to 100 percent, preferably from 50 percent to 100 percent, all in weight percentages based on the total weight of the polyfunctional amine solids of at least one or more classes of the amine containing monomers are disclosed in the U.S. Pat. Nos. 5,527,853, 5,340,870 and PCT Patent Application No. WO 96/22338, all of which are incorporated herein by reference.

In general, the polyfunctional amines may be obtained by solution polymerization in aqueous media, either neutral, alkaline, or acidic, depending upon the particular polymer sought, for example, as taught in U.S. Pat. 4,119,600 which is incorporated herein by reference.

Alternatively, the same polymer back bone of the polymer may be provided with both the acid functional moiety and the amine functional moiety, accomplished by a two stage polymerization process in which one stage contains the acid functional moiety, and the other stage contains the amine functional moiety. A process for preparing such binders is disclosed in U.S. Pat. No. 4,760,110 which is incorporated herein by reference.

If desired and depending on the intended use of the traffic paint, additional components may be added to the composition. These additional components include but are not limited to thickeners; rheology modifiers; dyes; sequestering agents; biocides; dispersants; pigments, such as, titanium dioxide, organic pigments, carbon black; extenders, such as, calcium carbonate, talc, clays, silicas and silicates; fillers, such as, glass or polymeric microspheres, quartz and sand; anti-freeze agents; plasticizers; adhesion promoters; coalescent; wetting agents; waxes; surfactants; slip additives; crosslinking agents; defoamers; colorants; tackifiers; waxes; preservatives; freeze/thaw protectors, corrosion inhibitors; anti-flocculants; and alkali or water soluble polymers.

If desired, the method of the present invention may include dropping glass beads on the layer of the traffic paint of the present invention before the layer is dry to ensure the adhesion of the glass beads to the layer applied to the road surface. Facially disposed glass beads on the traffic markings act as light reflectors. If glass beads are not used, the traffic markings would be difficult to see under night and wet weather conditions. Thus, almost all of the traffic markings are beaded, i.e., glass beads sprinkled and affixed on top of the coatings roughly at the rate of 0.72 to 2.9 kilograms or more per liter of paint for night and wet weather visibility. The glass beads are dropped by methods known in the art, such as, by spraying the glass beads entrained and conveyed by a jet of air and dropped atop the layer or by sprinkling the glass beads at a desired rate from a storage hopper positioned above the layer of the traffic paint of the present invention. The glass beads are applied over the layer, while the layer is still in its "wet" state, i.e., before the layer dries up to form the traffic paint marking. The amount of glass beads dropped on the layer is dependent upon the size, refractive index, and surface treatment of the glass beads. The typical glass beads specified for traffic markings are described under AASHTO Designation M 247-81 (1993) developed by American Association of State Highway and Transportation Officials, Washington, D.C. Optionally, glass beads may be premixed with the traffic paint before it is applied to road surfaces. The traffic paint used in the method of the present invention not only provides improved wear resistance over the alkyd-based traffic paints, but it also provides improved bead retention, which commonly refers to the degree of retention provided by the traffic paint binder to the facially disposed glass beads.

If desired, the no-pick-up time for the layer of the traffic paint of the present invention may be further improved by contacting the layer with a coagulant, which includes, weak acids, such as, aqueous acetic or citric acid, at a strength in range of from 10 percent to 30 percent, more preferably at 20 percent. Alternatively, stronger acids, such as, hydrochloric or sulfuric acids, diluted to a strength in the range of 5 to 15 percent, preferably 10 percent. Citric acid is preferred. The coagulant may be applied by any one of the conventional methods known in the art, such as, for example, by spraying the coagulant on the layer. It is believed without reliance thereon, that the coagulant when contacted with the layer coagulates the polymer present in the layer to improve the drying rate of the layer. The amount of the coagulant sprayed on the layer depends upon the amount of the polymer present in the layer and also upon the type of the polymer used in the traffic paint. The amount in weight percent of the coagulant sprayed on the layer of the coating composition depends upon the type of acid, its strength and the type of spraying equipment used in carrying out the coagulation step. The coagulant, such as, citric acid at 20 percent strength, applied at the rate in the range of 0.6 percent to 2 percent, preferably at 1 percent, all in weight percentages, based on the total weight of the coating composition applied as a layer is suitable.

| Abbreviations used in Examples below | |
|---|---|
| IBOMA | Iso-bornyl methacrylate |
| IBMA | Iso-butyl methacrylate |
| BMA | Butyl methacrylate |
| BA | butyl acrylate |
| MAA | Methacrylic Acid |
| MMA | Methyl Methacrylate |
| n-DDM | n-Dodecyl Mercaptan-Chain transfer agent (CTA) |

EXAMPLES OF VARIOUS POLYMERS

Comparative Polymer 1

To 1058.4 g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
|---|---|
| DI water | 628.9 |
| Dowfax 2A1 ®(45.6% active) surfactant* | 43.9 |
| butyl methacrylate | 234.0 |
| butyl acrylate | 760.0 |
| methyl methacrylate | 960.0 |
| methacrylic acid | 46.0 |

*The surfactant was supplied by Dow Chemical, Midland, Michigan

At the end of the polymerization, 0.01 g $FeSO_4$ in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=9.9 followed by the addition of 6.0 g Proxel® GXL bactericide (17% active ingredient) dissolved in 9.3 g DI water. Proxel® GXL bactericide was supplied by Zeneca, Inc. Wilmington, Del. The resulting polymer had a solids content of 48.8% and an average particle diameter of 200 nm.

Comparative Polymer 2

To 1057.7 g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
|---|---|
| DI water | 629.6 |
| Dowfax 2A1 ®(45.6% active) surfactant | 43.9 |
| butyl methacrylate | 634.0 |
| butyl acrylate | 600.0 |
| methyl methacrylate | 720.0 |
| methacrylic acid | 46.0 |

At the end of the polymerization, 0.01 g $FeSO_4$ in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=9.9 followed by the addition of 6.0 g Proxel® GXL bactericide (17% active ingredient) dissolved in 9.3 g DI water. The resulting polymer had a solids content of 48.8% and an average particle diameter of 191 nm.

Comparative Polymer 3

To 1058.4 g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
| --- | --- |
| DI water | 628.9 |
| Dowfax 2A1 ®(45.6% active) surfactant | 43.9 |
| butyl methacrylate | 1034.0 |
| butyl acrylate | 440.0 |
| methyl methacrylate | 480.0 |
| methacrylic acid | 46.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=9.9 followed by the addition of 6.0 g Proxel® GXL bactericide (17% active ingredient) dissolved in 9.3 g DI water. The resulting polymer had a solids content of 48.7% and an average particle diameter of 199 nm.

Polymer 4

To 1146.3 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture was then added over 3 hours at 81° C. along with a solution of 2.6 g ammonium persulfate dissolved in 100 g DI water followed by 50 g DI water.

| Monomer mixture: | in grams (g) |
| --- | --- |
| DI water | 680.0 |
| Dowfax 2A1 ®(45.6% active) surfactant | 47.4 |
| butyl methacrylate | 1980.7 |
| butyl acrylate | 129.6 |
| methacrylic acid | 49.7 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=9.9 followed by the addition of 6.4 g Proxel® GXL bactericide (17% active ingredient) dissolved in 10 g DI water. The resulting polymer had a solids content of 48.9% and an average particle diameter of 211 nm.

Comparative Polymer 5

To 1083.6 g of deionized (DI) water under a nitrogen atmosphere at 90° C. was added 7.2 g of ammonium bicarbonate dissolved in 55.6 g of DI water, 4.7 ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
| --- | --- |
| DI water | 629.6 |
| Dowfax 2A1 ®(45.6% active) surfactant | 43.9 |
| butyl methacrylate | 234.0 |
| butyl acrylate | 760.0 |
| methyl methacrylate | 960.0 |
| methacrylic acid | 46.0 |
| n-dodecylmercaptan | 25.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=9.9 followed by the addition of 6.1 g Proxel® GXL bactericide (17% active ingredient) dissolved in 9.3 g DI water. The resulting polymer had a solids content of 48.8% and an average particle diameter of 199 nm.

Comparative Polymer 6

To 1174.9 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture was then added over 3 hours at 81° C. along with a solution of 2.6 g ammonium persulfate dissolved in 100 g DI water followed by 50 g DI water.

| Monomer mixture: | in grams (g) |
| --- | --- |
| DI water | 680.0 |
| Dowfax 2A1 ®(45.6% active) surfactant | 47.4 |
| butyl methacrylate | 684.7 |
| butyl acrylate | 648.0 |
| methyl methacrylate | 777.6 |
| methacrylic acid | 49.7 |
| n-dodecylmercaptan | 27.0 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=9.9 followed by the addition of 6.6 g Proxel® GXL bactericide (17% active ingredient) dissolved in 10 g DI water. The resulting polymer had a solids content of 48.8% and an average particle diameter of 200 nm.

Comparative Polymer 7

To 1083.6 g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3. g DI water.

| Monomer mixture: | in grams (g) |
|---|---|
| DI water | 629.6 |
| Dowfax 2A1 ®(45.6% active) surfactant | 43.9 |
| butyl methacrylate | 1034.0 |
| butyl acrylate | 440.0 |
| methyl methacrylate | 480.0 |
| methacrylic acid | 46.0 |
| n-dodecylmercaptan | 25.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=10.0 followed by the addition of 6.1 g Proxel® GXL bactericide (17% active ingredient) dissolved in 9.3 g DI water. The resulting polymer had a solids content of 48.8% and an average particle diameter of 202 nm.

Polymer 8

To 1174.9 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture was then added over 3 hours at 81° C. along with a solution of 2.6 g ammonium persulfate dissolved in 100 g DI water followed by 50 g DI water.

| Monomer mixture: | in grams (g) |
|---|---|
| DI water | 680.0 |
| Dowfax 2A1 ®(45.6% active) surfactant | 47.4 |
| butyl methacrylate | 1548.7 |
| butyl acrylate | 302.4 |
| methyl methacrylate | 259.2 |
| methacrylic acid | 49.7 |
| n-dodecylmercaptan | 27.0 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=10.0 followed by the addition of 6.6 g Proxel® GXL bactericide (17% active ingredient) dissolved in 10 g DI water. The resulting polymer had a solids content of 48.8% and an average particle diameter of 195 nm.

Polymer 9

To 1174.3 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture was then added over 3 hours at 81° C. along with a solution of 2.6 g ammonium persulfate dissolved in 100 g DI water followed by 50 g DI water.

| Monomer mixture: | in grams (g) |
|---|---|
| DI water | 680.6 |
| Dowfax 2A1 ®(45.6% active) surfactant | 47.4 |
| butyl methacrylate | 1980.7 |
| butyl acrylate | 129.6 |
| methacrylic acid | 49.7 |
| n-dodecylmercaptan | 27.0 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=10.0 followed by the addition of 6.4 g Proxel® GXL bactericide (17% active ingredient) dissolved in 9.3 g DI water. The resulting polymer had a solids content of 48.7% and an average particle diameter of 200 nm.

Comparative Polymer 10

Polymer 10 was Rhoplex® AC-630® acrylic emulsion supplied by Rohm and Haas Company, Philadelphia, Pa.

Polymer 11

To 1143.6 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture 30 was then added over 3 hours at 81° C. along with a solution of 2.6 g ammonium persulfate dissolved in 100 g DI water followed by 50 g DI water.

| Monomer mixture: | in grams (g) |
|---|---|
| DI water | 680.6 |
| Dowfax 2A1 ® (45.6% active) surfactant | 47.4 |
| iso-butyl methacrylate | 1527.1 |
| butyl acrylate | 583.2 |
| methacrylic acid | 49.7 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=10.1 followed by the addition of 6.4 g Proxel® GXL bactericide (17% active ingredient) dissolved in 10 g DI water. The resulting polymer had a solids content of 48.5% and an average particle diameter of 199 nm.

Polymer 12

To 1143.6 g of deionized (DI) water under a nitrogen atmosphere at 90° C. was added 7.8 g of ammonium bicarbonate dissolved in 60 g of DI water, 5.1 g ammonium persulfate dissolved in 50 g DI water and 156.4 g polymer seed latex (solids content 42% average particle diameter of 60 nm) followed by 30 g of DI water to form a reaction mixture to which the following monomer mixture was then added over 3 hours at 81° C. along with a solution of 2.6 g ammonium persulfate dissolved in 100 g DI water followed by 50 g DI water.

| Monomer mixture: | in grams (g) |
| --- | --- |
| DI water | 680.6 |
| Dowfax 2A1 ® (45.6% active) surfactant | 47.4 |
| iso-butyl methacrylate | 1494.7 |
| ethylhexyl acrylate | 615.6 |
| methacrylic acid | 49.7 |

At the end of the polymerization, 0.01 g FeSO4 in 8.9 g DI water, 0.01 g of the tetrasodium salt of ethylenediamine tetraacetic acid in 0.9 g of DI water, 1.8 g t-butylhydroperoxide in 20 g DI water and 0.6 g isoascorbic acid in 20 g DI water were added at 60° C. to the reaction product. Ammonium hydroxide was added to give a final pH=10.2 followed by the addition of 6.4 g Proxel® GXL bactericide (17% active ingredient) dissolved in 10 g DI water. The resulting polymer had a solids content of 48.3% and an average particle diameter of 188 nm.

Polymer 13

To 1054.7g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
| --- | --- |
| DI water | 630.2 |
| Dowfax 2A1 ® (45.6% active) surfactant | 43.9 |
| ethyl methacrylate | 1314.0 |
| butyl acrylate | 640.0 |
| methacrylic acid | 46.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=10.0 followed by the addition of 5.9 g Proxel® GXL bactericide (17% active ingredient) dissolved in 10 g DI water. The resulting polymer had a solids content of 48.6% and an average particle diameter of 199 nm.

Polymer 14

To 1054.7g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
| --- | --- |
| DI water | 630.2 |
| Dowfax 2A1 ® (45.6% active) surfactant | 43.9 |
| isobornyl methacrylate | 914.0 |
| butyl acrylate | 1040.0 |
| methacrylic acid | 46.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=10.1 followed by the addition of 5.9 g Proxel® GXL bactericide (17% active ingredient) dissolved in 10 g DI water. The resulting polymer had a solids content of 48.6% and an average particle diameter of 197 nm.

Comparative Polymer 15

To 1054.7g of deionized (DI) water under a nitrogen atmosphere at 90° C. was added 7.2 g of ammonium bicarbonate dissolved in 55.6 g of DI water, 4.7 g ammonium persulfate dissolved in 46.3 g DI water and 144.9 g polymer seed latex (solids content 42% average particle diameter of 60 nm) followed by 27.8 g of DI water to form a reaction mixture to which the following monomer mixture was then added over 3 hours at 81° C. along with a solution of 2.4 g ammonium persulfate dissolved in 92.6 g DI water followed by 46.3 g DI water.

| Monomer mixture: | in grams (g) |
| --- | --- |
| DI water | 630.2 |
| Dowfax 2A1 ® (45.6% active) surfactant | 43.9 |
| iso-butyl methacrylate | 1094.0 |
| ethyl acrylate | 860.0 |
| methacrylic acid | 46.0 |

At the end of the polymerization, 0.01 g FeSO4 in 8.2 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=9.9 followed by the addition of 5.9 g Proxel® GXL bactericide (17% active ingredient) dissolved in 10 g DI water. The resulting polymer had a solids content of 48.8% and an average particle diameter of 213 nm.

Polymer 16

To 1007.2 g of deionized (DI) water under a nitrogen atmosphere at 90° C. was added 12.8 g of ammonium bicarbonate dissolved in 57.7 g of DI water, 4.9 g ammonium persulfate dissolved in 48 g DI water and 150.3 g polymer seed latex (solids content 42% average particle diameter of 60 nm) followed by 28.8 g of DI water to form a reaction mixture to which the following monomer mixture was then added over 3 hours at 83° C. along with a solution of 2.5 g ammonium persulfate dissolved in 96.1 g DI water followed by 48 g DI water.

| Monomer mixture: | in grams (g) |
|---|---|
| DI water | 653.2 |
| Sodium lauryl sulfate (28% active) | 29.6 |
| butyl methacrylate | 1763.8 |
| butyl acrylate | 51.9 |
| methyl methacrylate | 186.8 |
| methacrylic acid | 72.6 |
| n-dodecylmercaptan | 25.9 |

At the end of the polymerization, 0.01 g FeSO4 in 8.5 g DI water, 0.01 g of the tetrasodium salt of ethylenediamine tetraacetic acid in 0.9 g of DI water, 1.8 g t-butylhydroperoxide in 18.6 g DI water and 0.6 g isoascorbic acid in 18.6 g DI water were added at 60° C. to the reaction product. Ammonium hydroxide was added to give a final pH=7.2 followed by the addition of 5.9 g Proxel® GXL bactericide (17% active ingredient) dissolved in 9.6 g DI water. The resulting polymer had a solids content of 50.4% and an average particle diameter of 226 nm.

Comparative Polymer 17

Polymer 18 was Rhoplex® Fastrack®2706 acrylic emulsion supplied by Rohm and Haas Company, Philadelphia, Pa.

Comparative Polymer 18

To 925 g of deionized (DI) water under a nitrogen atmosphere at 92° C. was added 6.5 g ammonium persulfate dissolved in 35 g DI water and 195 g polymer seed latex (solids content 42% average particle diameter of 60 nm) followed by 20 g of DI water to form a reaction mixture to which the following monomer mixture was then added over 3 hours at 81° C. along with a solution of 4.3 g ammonium persulfate and 11.6 g of 28% NH40H dissolved in 100 g DI water followed by 35 g DI water.

| Monomer mixture: | in grams (g) |
|---|---|
| DI water | 700 |
| Alipal CO-436 (58% active) sufactant* | 27.9 |
| 2-ethylhexyl acrylate | 927 |
| styrene | 1112.4 |
| methacrylic acid | 75.6 |
| n-dodecylmercaptan | 27 |

At the end of the polymerization, 0.01 g FeSO4 in 9 g DI water, 3.6 g t-butylhydroperoxide in 20 g DI water and 1.3 g sodium sulfoxylate formaldehyde in 20 g DI water were added at 60° C. to the reaction product. Ammonium hydroxide was added to give a final pH=10.6 followed by the addition of 5.9 g of formaldeyhde (37% active) and 103 g of polyoxazolidinylethyl methacrylate (26.4% active) followed by 20 g DI water. The resulting styrene based comparative polymer had a solids content of 50.2% and an average particle diameter of 192 nm.

Preparation of polyamine

To a 2-liter reactor containing 600 g of DI water under a nitrogen atmosphere at 60° C., 2.8 g of an aqueous solution of ferrous sulfate heptahydrate (0.15%) and 0.8 g of an aqueous solution of the tetrasodium salt of ethylenediamine tetraacetic acid (1%) diluted with 10 g DI water were added with stirring. A feed of composed of 200 g 2-(3-oxazolidinyl)ethyl methacrylate (OXEMA) and 100 g DI water was added over a 2 hour period. Simultaneously, feeds composed of 2 g t-butylhydroperoxide (70% active) dissolved in 23 g DI water and 2 g sodium sulfoxylate formaldehyde dihydrate dissolved in 23 g DI water were added over a 2 hour period. After completion of the feeds, the reaction was held at 60° C. for 30 minutes then 0.16 g of t-butylhydroperoxide (70% active) dissolved in 10 DI water was added. Fifteen minutes later, 0.1 g of t-butylhydroperoxide (70% active) dissolved in 10 g DI water and 0.06 g sodium sulfoxylate formaldehyde dihydrate dissolved in 10 g DI water were added. Fifteen minutes later the reaction was cooled to room temperature. The polyfunctional amine had a pH of 8.2, solids content 17.6% and a Brookfield viscosity (spindle 2 at 60 rpm) of 30 cps.

Preparation of Traffic Paints Traffic Paints 1 through 15

Traffic Paints 1 through 15 were prepared according to the following formulations. The ingredients were added in the order given under low shear laboratory mixing. After the addition of the extender (identified in Table 1 as "H"), stirring was continued for 15 minutes before the addition of the remaining ingredients.

TABLE 1

| | Ingredients for Traffic Paints 1 through 15 (Pt1 through Pt15). | | | | | | | | | | | | |
|---|---|---|---|---|---|---|---|---|---|---|---|---|---|
| Pt | A | B | C | D | E | F | G | H | I | J | K | L | M |
| 1 | 460.1 P1 | 4.6 | 15.9 | 7.2 | 2.8 | 2.0 | 100.0 | 760.6 | 30.0 | 23.0 | 11.6 | 3.5 | 7.0 |
| 2 | 460.1 P2 | 4.6 | 15.9 | 7.2 | 2.8 | 2.0 | 100.0 | 760.6 | 30.0 | 23.0 | 11.6 | 3.5 | 7.0 |
| 3 | 460.1 P3 | 4.6 | 15.9 | 7.2 | 2.8 | 2.0 | 100.0 | 760.6 | 30.0 | 23.0 | 11.6 | 3.5 | 7.0 |

TABLE 1-continued

Ingredients for Traffic Paints 1 through 15 (Pt1 through Pt15).

| Pt | A | B | C | D | E | F | G | H | I | J | K | L | M |
|---|---|---|---|---|---|---|---|---|---|---|---|---|---|
| 4 | 460.1 P4 | 4.6 | 15.9 | 7.2 | 2.8 | 2.0 | 100.0 | 760.6 | 30.0 | 23.0 | 11.6 | 3.5 | 7.0 |
| 5 | 460.1 P5 | 4.6 | 15.9 | 7.2 | 2.8 | 2.0 | 100.0 | 760.6 | 30.0 | 23.0 | 11.6 | 3.5 | 7.0 |
| 6 | 460.1 P6 | 4.6 | 15.9 | 7.2 | 2.8 | 2.0 | 100.0 | 760.6 | 30.0 | 23.0 | 11.6 | 3.5 | 7.0 |
| 7 | 460.1 P7 | 4.6 | 15.9 | 7.2 | 2.8 | 2.0 | 100.0 | 760.6 | 30.0 | 23.0 | 11.6 | 3.5 | 7.0 |
| 8 | 460.1 P8 | 4.6 | 15.9 | 7.2 | 2.8 | 2.0 | 100.0 | 760.6 | 30.0 | 23.0 | 11.6 | 3.5 | 7.0 |
| 9 | 460.1 P9 | 4.6 | 15.9 | 7.2 | 2.8 | 0.40 | 100.0 | 760.6 | 30.0 | 23.0 | 11.6 | 3.5 | 7.0 |
| 10 | 92.0 P10 | 0.65 | 3.18 | 1.44 | 0.56 | 0.40 | 20.0 | 152.1 | 6.0 | 4.6 | 2.32 | 0.7 | 1.4 |
| 11 | 94.9 P11 | 0.65 | 3.18 | 1.44 | 0.56 | 0.40 | 20.0 | 152.1 | 6.0 | 4.6 | 2.32 | 0.7 | 1.4 |
| 12 | 94.9 P12 | 0.65 | 3.18 | 1.44 | 0.56 | 0.40 | 20.0 | 152.1 | 6.0 | 4.6 | 2.32 | 0.7 | 1.4 |
| 13 | 94.9 P13 | 0.65 | 3.18 | 1.44 | 0.56 | 0.40 | 20.0 | 152.1 | 6.0 | 4.6 | 2.32 | 0.7 | 1.4 |
| 14 | 94.9 P14 | 0.65 | 3.18 | 1.44 | 0.56 | 0.40 | 20.0 | 152.1 | 6.0 | 4.6 | 2.32 | 0.7 | 1.4 |
| 15 | 94.9 P15 | 0.65 | 3.18 | 1.44 | 0.56 | 0.40 | 20.0 | 152.1 | 6.0 | 4.6 | 2.32 | 0.7 | 1.4 |

Unless stated otherwise, the following commercial components were used throughout. All weights are stated in grams:

A means Polymers P4, P7, P8, P9, P11, P12, P13 and P14, and Comparative Polymers P1, P2, P3, P5, P6, P10 and P15 described above.
B means Triton® X-405 Octyl phenoxy polyethoxyethanol surfactant supplied by Union Carbide Chemicals, Inc., Danbury, Conn. @ 70 percent solids by weight.
C means polyamine described above
D means Tamol® 901 Dispersant, an ammonium salt of an polyelectrolyte supplied by Rohm and Haas Company, Philadelphia, Pa. @ 30 percent based on the solids.
E means Surfynol® CT-136 Surfactant, an acetylenic surfactant supplied by Air Products and Chemicals, Inc., Allentown, Pa.
F means Drew® L-493 Defoamer supplied by Drew Chemical Company, Boonton, N.J.
G means Ti Pure® R-900 Titanium dioxide supplied by E. I. duPont de Nemours & Company, Wilmington, Del.
H means Omyacarb® 5, Ground natural calcium carbonate, evaluated under ASTM D 1199, Type GC, Grade II having a number average particle size of 5.5 microns with maximum oil absorption No. of 10, supplied by Omya, Inc., Proctor, Vt.
I means methanol*
J means Texanol® Ester alcohol supplied by Eastman Chemicals, Kingsport, Tenn.*
K means water*
L means Drew® L-493 Defoamer supplied by Drew Chemical Company, Boonton, N.J.
M means Natrosol 250 HR supplied by Aqualon, Inc., Wilmington, Del.
* premixed prior to adding to paint preparation.

Testing of Wear Resistance of Traffic Markings from the Foregoing Traffic Paints 1 through 15 (Pt1 through Pt15)

Test panels were prepared by spraying layers of Traffic Paints 1 through 15 onto a smooth concrete test block having no exposed aggregates on the surface (supplied by Patio Concrete Co, Levittown, Pa.). A conventional air spray was used to spray a wet film thickness of 0.38 mm. (15 mils). The layers were dried at room temperature for the time specified below to produce traffic markings, which were then wear tested under the procedure described below:

The wear test used herein measures the durability or wear resistance of a traffic markings under accelerated conditions by contacting the surface of the traffic markings repeatedly with rolling wear wheels under pressure through a curved path by means a testing device called Trafficometer, which is described in a copending commonly assigned patent application having a Ser. No. 60/029,973, which is incorporated herein by reference. The rolling wheels on dolly of the Trafficometer simulate actual wear conditions experienced by traffic markings on roads. The test panel placed in the Trafficometer were cycled between wet and dry testing conditions by flooding the test chamber with water. The number of cumulative rotations of the Trafficometer wheel dolly shown in Tables 2, 3 and 4 shown below were in 1000's of rotations. The wear data is presented in Tables 2, 3 and 4 as the area in square millimeters of paint removed from the panel. In some experiments the test panels were preconditioned by running them in the Trafficometer with water for a specified number of cycles, then removing from the Trafficometer and drying them prior to the application of the traffic paints.

TABLE 2

| | Pt10 1.3% MAA 53.3% MMA BA | Pt11 2.3% MAA IBMA BA | Pt12 2.3% MAA IBMA EHA | Pt13 2.3% MAA EMA BA | Pt14 2.3% MAA IBOMA BA | Pt15 2.3% MAA 43% EA IBMA |
|---|---|---|---|---|---|---|
| hydrophilic monomers | | | | | | |
| hydrophobic monomers | | | | | | |
| wet 6.5 k | 0 | 0 | 0 | 0 | 0 | 0 |
| dry 8.6 k | 50 | 0 | 0 | 0 | 0 | 0 |
| 9.7 k | 125 | 0 | 0 | 0 | 0 | 20 |
| wet 14.6 k | 150 | 0 | 0 | 0 | 0 | 30 |
| dry 21.4 k | 745 | 0 | 0 | 0 | 0 | 50 |

TABLE 2-continued

| | Pt10 1.3% MAA 53.3% MMA BA | Pt11 2.3% MAA IBMA BA | Pt12 2.3% MAA IBMA EHA | Pt13 2.3% MAA EMA BA | Pt14 2.3% MAA IBOMA BA | Pt15 2.3% MAA 43% EA IBMA |
|---|---|---|---|---|---|---|
| hydrophilic monomers | | | | | | |
| hydrophobic monomers | | | | | | |
| wet 24.5 k | 875 | 0 | 0 | 20 | 0 | 340 |
| 27.1 k | 1150 | 0 | 0 | 20 | 0 | 375 |
| dry 34.7 k | 1675 | 0 | 0 | 40 | 0 | 610 |
| wet 39.2 k | 1675 | 0 | 0 | 60 | 0 | 970 |
| dry 47.3 k | 1850 | 0 | 0 | 80 | 40 | 1590 | preconditioning: 50.5 k cycles
marking dry time: 24 hrs

Table 2 indicates that as long as the amount of hydrophobic monomers in the polymer is at least 80 percent by weight, various combinations of such hydrophobic monomers would result in wear resistant traffic paints.

TABLE 3

| | Pt1 2.3% MAA 48% MMA BMA BA | Pt2 2.3% MAA 36% MMA BMA BA | Pt3 2.3% MAA 24% MMA BMA BA | Pt4 2.3% MAA BMA BA |
|---|---|---|---|---|
| hydrophilic monomers | | | | |
| hydrophobic monomers | | | | |
| 170 k | 2700 | 2020 | 1800 | 0 | preconditioning: 0 k cycles
marking dry time: 24 hrs

Table 3 indicates that as the amount of hydrophilic monomers in the polymer of the traffic paint decreases, the wear resistance of the resultant traffic markings increases.

TABLE 4

| | Pt5 2.3% MAA 48% MMA BMA BA nDDM | Pt6 2.3% MAA 36% MMA BMA BA nDDM | Pt7 2.3% MAA 24% MMA BMA BA nDDM | Pt8 2.3% MAA 12% MMA BMA BA nDDM | Pt9 2.3% MAA BMA BA nDDM |
|---|---|---|---|---|---|
| hydrophilic monomers | | | | | |
| hydrophobic monomers | | | | | |
| 170 k | 1380 | 1400 | 1080 | 0 | 0 | preconditioning: 0 k cycles
marking dry time: 24 hrs

Table 4 indicates that as the amount of hydrophilic monomers in the polymer of the traffic paint decreases, the wear resistance of the resultant traffic markings increases. Additionally, when the molecular weight of the polymer is reduced, further improvement in the wear resistance of the resultant traffic markings is seen.

From Tables 2, 3 and 4, it can be seen that Traffic Paints 4, 8, 9, 11, 12, 13, and 14 of this invention exhibit superior wear resistance in comparison to Comparative Traffic Paints 1, 2, 3, 5, 6, 7, 10, and 15, the latter having more than 20% by weight of hydrophilic monomers.

Preparation of Traffic Paints Traffic Paints 16 through 19

Traffic Paints 16 through 19 were prepared according to the following formulations. The ingredients were added in the order given under low shear laboratory mixing.

TABLE 5

Ingredients for Traffic Paints 16 through 19
A-(Pt16 through Pt18).

| Ingredients | Pt16 | Pt17 | Pt18 |
|---|---|---|---|
| Polymer | 4123.7 (P16) | 8568.5 (P17) | 433.6 (P18) |
| N | 85.1 | 15.8 | |
| O | 95.9 | | |
| P | | | 20.3* |
| Q | | | 3.6* |
| D | 65.3 | 134.1 | 6.7 |
| E | 38.1 | 52.1 | 2.8 |
| F | 18.1 | 37.2 | 2.0 |
| G | 907.0 | 1862.3 | 100.0 |
| H | 6898.9 | 14164.8 | 760.6 |
| R | | | 14.5 |
| I | 272.1* | 558.7* | 19.8 |
| J | 208.6* | 428.3* | 8.7 |
| K | 171.9* | 216.0* | |
| S | | 95.0 | |
| L | 31.7 | 65.2 | 3.5 |
| M | 63.5 | 130.4 | 20.0*** |
| T | | | |

B-(Pt19)

| Ingredients | Pt19 |
|---|---|
| Polymer | 459.67 (P17) |
| D | 7.23 |
| E | 2.81 |
| L | 2.03 |
| G | 99.57 |
| H | 757.67 |
| I | 29.84 |
| J | 22.89 |

TABLE 5-continued

Ingredients for Traffic Paints 16 through 19
A-(Pt16 through Pt18).

| E | 3.53 |
| M | 7.00 |
| P | 11.50 |
| U | 1.73 |

In addition to the terms stated earlier in Table 1, the following additional commercial components were used. All weights are stated in grams:

N means 14% ammonia.
O means polyoxazolidinylethyl methacrylate
R means 30% benzophenone in methanol.
P, S and T mean water.
Q means EP-120 (30%) Alipal CO-436 surfactant currently supplied by Rhone Poulenc, Cranberry, N.J. under the name of Rhodafac™ CO-436 surfactant.

U means 28% ammonia.

\* premixed prior to adding to paint preparation.

\*\* premixed

To confirm the results obtained on a Trafficometer test described earlier, Traffic paint 16 and Comparative Traffic Paint 17 were road tested under actual conditions for 24 months in Texas by applying them over the road surface as transverse lines for exposing them to maximum traffic conditions. The wear resistance of the traffic markings obtained from these two paints are shown in Table 6 below:

TABLE 6*

| Test Date from Day 1 | Traffic Paint 16 | | Comparative Traffic Paint 17 | |
|---|---|---|---|---|
| | Beaded | Not Beaded | Beaded | Not Beaded |
| 7 days | | | 98 | 70 |
| 29 days | 100 | 83 | | |
| 36 days | | | 35 | 5 |
| 58 days | 85 | 45 | | |
| 65 days | | | 15 | 0 |
| 127 days | | | 5 | |
| 244 days | 85 | 35 | | |
| 251 days | | | 3 | |
| 405 days | 80 | 33 | | |
| 412 days | | | 3 | |
| 588 days | 68 | 25 | | |
| 595 days | | | 3 | |

*The test results shown are the areas in percentage of traffic markings still remaining on the road surface.

As seen from Table 6 above, the wear resistance, expressed as the area of traffic marking still remaining on the road surface, of Traffic Paint 16 was significantly better than that provided by Comparative Traffic Paint 17.

The effect of UV radiation on styrene-based traffic paint versus non-styrene based traffic paint was also measured. Styrene based Comparative Traffic paint 16 and Styrene Free Comparative Traffic Paint 18 were road tested over asphalt and concrete road surfaces for 36 months in Pennsylvania by applying them as transverse lines to obtain maximum exposure to sun and the traffic. The traffic paint was mixed with 2.721 kilograms of reflective glass beads per 3.77 liters of paint to provide the traffic markings with night time visibility. The wear of the traffic markings was determined by measuring the reflectivity of the traffic markings. The retroreflectance (Ref) of the reflective traffic markings was measured in milliCandellas at certain measurement intervals by means of Mirolux 12 Portable Retroreflectometer supplied by Miro-Bran Assemblers Inc., Paterson, N.J. The results are shown in Table 7 for Comparative Traffic paint 16 and in Table 7 for Comparative Traffic paint 18 below:

TABLE 7

| Measurement Interval | Pt16 Ref on Asphalt | Pt18 Ref on Asphalt | Pt16 Ref on Concrete | Pt18 Ref on Concrete |
|---|---|---|---|---|
| August 94 | 350 | 405 | 375 | 394 |
| November 94 | 313 | 316 | 338 | 360 |
| November 95 | 197 | 210 | 198 | 240 |
| October 96 | 106 | 97 | 56 | 53 |
| August 97 | 82 | 87 | No beads left | No beads left |

As seen from Table 7 above, the styrene based traffic paint wears out at a faster rate than a traffic paint free from styrene, as shown by the loss of retroreflectance of the road markings.

What is claimed is:

1. A method of producing a wear resistant traffic marking on a road surface, said method comprising:

applying on said road surface a layer of an aqueous traffic paint, which comprises a polymer polymerized from a monomer mixture that includes in the range of from 80 percent to 99.9 percent, all in weight percentages based on polymer solids, of one or more hydrophobic monomers selected from the group consisting of isobornyl methacrylate, butyl methacrylate, isobutyl (meth) acrylate, ethyl methacrylate, 2-ethylhexyl methacrylate, stearyl (meth)acrylate, lauryl (meth) acrylate, butadiene ethylene, and combinations thereof; and wherein said monomer mixture is free from styrene or substituted styrene monomers; and drying said layer to form said wear resistant traffic marking on said road surface.

2. The method of claim 1 further comprising contacting said layer with polyamine immediately prior to, during or after applying said layer on said surface.

3. The method of claim 2 wherein said paint or said polyamine further comprises reflective beads.

4. The method of claim 1 or 2 further comprising spraying reflective beads on said layer.

5. The method of claim 1 wherein said hydrophobic monomer is butyl methacrylate.

6. A traffic marking made in accordance with the method of claim 1.

7. An aqueous traffic paint comprising a polymer polymerized from a monomer mixture that includes in the range of from 80 percent to 99.9 percent, all in weight percentages based on polymer solids, of one or more hydrophobic monomers monomers selected from the group consisting of isobornyl methacrylate, butyl methacrylate, isobutyl (meth) acrylate, ethyl methacrylate, 2-ethylhexyl methacrylate, stearyl (meth)acrylate, lauryl (meth)acrylate, butadiene, ethylene, and combinations thereof; and wherein said monomer mixture is free from styrene or substituted styrene monomers.

8. The aqueous traffic paint of claim 7 further comprising a polyamine.

\* \* \* \* \*